US008863195B2

(12) United States Patent
Kassam et al.

(10) Patent No.: US 8,863,195 B2
(45) Date of Patent: Oct. 14, 2014

(54) MEDIA MANAGER

(75) Inventors: Shafiq Kassam, Lewisville, TX (US);
Prabhakar Mani, Lewisville, TX (US);
Anup Nanda, Irving, TX (US); Maitreyi Krishnaswamy, New York, NY (US);
Anil Guntupalli, Wayland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1487 days.

(21) Appl. No.: 11/612,650

(22) Filed: Dec. 19, 2006

(65) Prior Publication Data
US 2008/0148332 A1     Jun. 19, 2008

(51) Int. Cl.
| | |
|---|---|
| *G06F 3/00* | (2006.01) |
| *G06F 13/00* | (2006.01) |
| *H04N 5/445* | (2011.01) |
| *H04N 21/431* | (2011.01) |
| *H04N 21/472* | (2011.01) |
| *H04N 21/482* | (2011.01) |
| *H04N 21/6547* | (2011.01) |
| *H04N 7/173* | (2011.01) |
| *H04N 21/436* | (2011.01) |

(52) U.S. Cl.
CPC ....... *H04N 7/17318* (2013.01); *H04N 21/4312* (2013.01); *H04N 21/47202* (2013.01); *H04N 21/482* (2013.01); *H04N 21/6547* (2013.01); *H04N 21/4314* (2013.01); *H04N 21/436* (2013.01)
USPC .................. 725/52; 725/37; 725/40; 725/41; 725/46; 725/49; 725/51; 725/55

(58) Field of Classification Search
USPC .................. 725/78–85, 141, 52–55, 153, 37, 725/40–41, 46, 49, 51
See application file for complete search history.

(56) References Cited

U.S. PATENT DOCUMENTS

| | | | | |
|---|---|---|---|---|
| 6,567,783 | B1 * | 5/2003 | Notani et al. | 705/9 |
| 6,567,983 | B1 * | 5/2003 | Shiimori | 725/105 |
| 6,928,652 | B1 * | 8/2005 | Goldman | 725/37 |
| 7,159,174 | B2 * | 1/2007 | Johnson et al. | 715/716 |
| 2002/0054131 | A1 * | 5/2002 | Ozawa et al. | 345/784 |
| 2004/0117845 | A1 * | 6/2004 | Karaoguz et al. | 725/134 |
| 2006/0107289 | A1 * | 5/2006 | DeYonker et al. | 725/37 |

OTHER PUBLICATIONS

"AT&T Launches Homezone, First Major Telecommunications Provider to Integrate TV and Broadband", 2006 AT&T Knowledge Ventures.

* cited by examiner

*Primary Examiner* — Pankaj Kumar
*Assistant Examiner* — Alazar Tilahun (57) ABSTRACT

A content processing device within a customer premises is connected to a first network internal to the customer premises and is also connected to a second network external to the customer premises. The content processing device is configured to download via the second network, and then to execute, instructions to detect a computing device within the first network and then to request selectively specified media content from the computing device, whereby the specified media content is retrieved from the computing device via the first network.

28 Claims, 6 Drawing Sheets

MEDIA MANAGER

BACKGROUND INFORMATION

Presently, many telecommunications customers receive video content via a content processing device, such as a set top box (STB). Often, such telecommunications customers operate a data network for receiving data services, e.g., the Internet, and/or for data communications within the customer premises. However, content processing devices are generally not utilized in connection with the customer's data network. This is unfortunate because devices, e.g., computers, on the customer's data network, often include multimedia content that would be enhanced by being played back through the content processing device. For example, content processing devices such as STBs are often connected to media playback devices such as high-definition televisions, stereos, and the like that are designed for enhanced playback of many forms of media content, including any combination of images, audio, video, etc.

Present systems and methods for playing multimedia content through a content processing device such as an STB generally require a dedicated hardware connection, such as a universal serial bus (USB) connection, for playing the multimedia content through the STB. Using a connection such as a USB connection, many present systems and methods depend on specialized software for synchronizing content on a multimedia device with data stored on the STB.

Further, some systems and methods presently exist that allow a content processing device such as an STB to obtain multimedia content by accessing a server remote from the customer premises where the STB is located, and by downloading the multimedia content over a network such as the Internet. However, both the remote server and the network likely suffer from bandwidth and availability constraints that can make it inconvenient and difficult to access desired multimedia content. Such systems and methods seem particularly ungainly when one considers that many users have within their own customer premises computing devices with multimedia content that would be enhanced by viewing through a content processing device such as an STB, and that need not be accessed through an external network.

Accordingly, at present, telecommunications customers may play multi-media content stored on their computers through content processing devices such as STBs only with specialized hardware, software, and a manual effort of connecting hardware to the STB or by using a public external network such as the Internet. Telecommunications customers presently have no easy and efficient way in which to play multimedia content located on computing devices within their own customer premises utilizing any available media playback device, e.g., television sets, stereo receivers, etc., that are connected to content processing devices such as an STB.

DETAILED DESCRIPTION OF PREFERRED EMBODIMENTS

Figure 1:
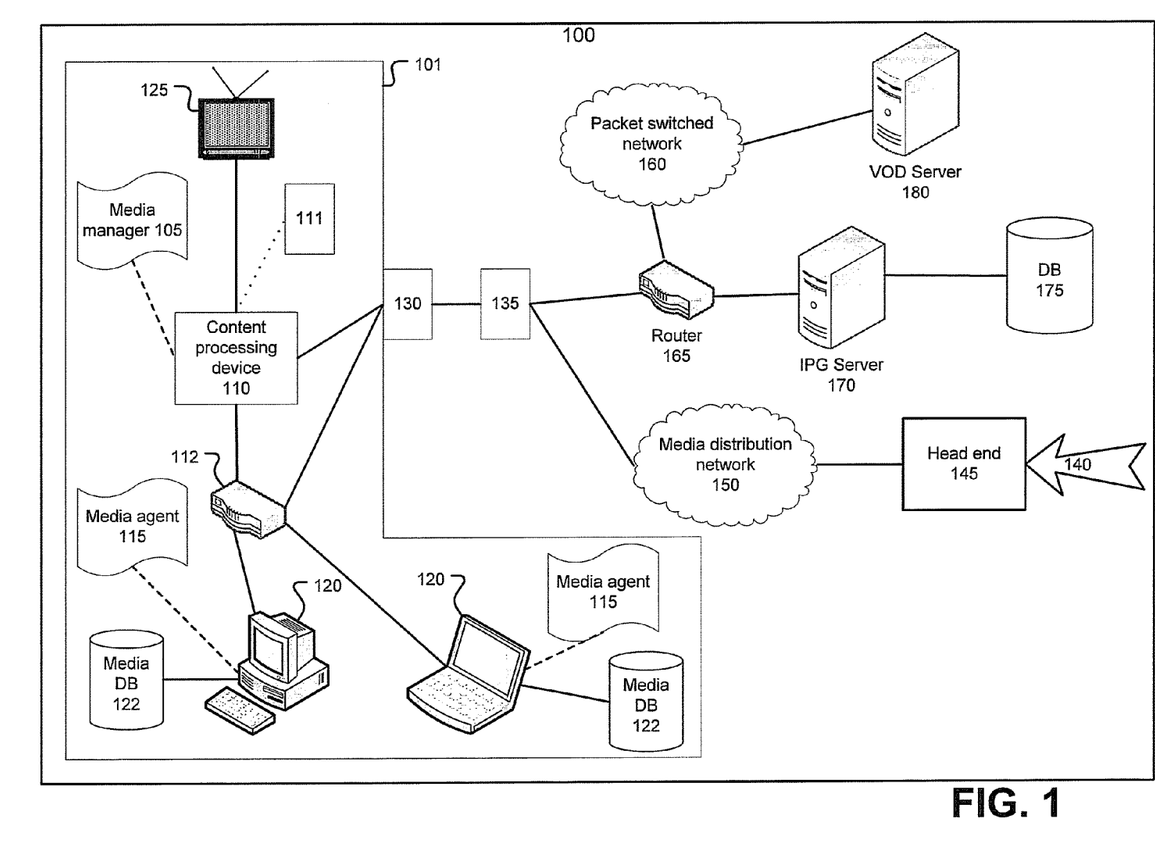
FIG. 1 illustrates an exemplary system that includes a customer premises network in which user-selected multimedia content such as images and sound may be provided through to a media playback device through a content processing device attached to the customer premises network.

FIG. 1 illustrates an exemplary system 100 that includes a customer premises network 101 in which user-selected media content, including any combination of images, audio, video, etc., may be provided to a media playback device 125 through a content processing device 110 attached to the customer premises network 101.

As illustrated in FIG. 1, customer premises network 101 includes devices within a customer premises including content processing device 110. Content processing device 110 may be a set top box (STB) or similar device known for receiving a media signal from a network and for providing media programming, e.g., audio, video, etc., to a media playback device 125. Content processing device 110 may be controlled by a user through a control 111, thereby facilitating the selection and playing of content through media playback device 125. An example of content processing device 110 is set top box model DCT6416 made by Motorola, Inc. of Schaumburg, Ill.

A media manager 105, which runs on content processing device 110, includes computer-executable instructions that are generally stored in a computer-readable medium, e.g., a memory, of content processing device 110, and that may be executed by a processor included within content processing device 110. A process for using media manager 105 is discussed below with reference to FIG. 4. In general, media manager 105 allows a user of content processing device 110 and media playback device 125 to access and thereby view and/or listen to media content that is stored in a media database 122 associated with a computing device 120.

Control 111 is generally a remote control known for selectively communicating with content processing device 110 through wireless communications, such as infrared (IR) communications. Control 111 generally includes numeric keys for selecting channels of video programming, as well as other keys for making selections and requests according to menus displayed on computing device 120, in addition to arrow keys and the like for selecting channels and items in a menu, changing volume levels, etc.

A router 112 is used for establishing and operating, or at least connecting to, a network such as a home network or local area network (LAN), and is used to route communications within customer premises network 101. Significantly, router 112 provides for connection not only of one or more computing devices 120, but also allows for connection of content processing device 110. For example, content processing device 110 may be a set-top box connected to router 112 by a coaxial cable, while computing devices 120 may be connected to router 112 using a wireless connection, a network cable such as a "Cat5" cable, or the like. Further, content processing device 110 and computing device 120 are uniquely identified by router 112 in a known manner. For example, in an embodiment, Dynamic Host Configuration Protocol (DHCP) is used to dynamically assign "private" DHCP Internet Protocol (IP) addresses to content processing device 110 and computing devices 120, i.e., IP addresses that are only accessible to devices such as devices 110 and 120 that are on customer premises network 101, i.e., directly connected to router 112.

Media playback device 125 may include a variety of known equipment alone or in combination, such as a video receiver, including a conventional television or a hi-definition television (HDTV), audio equipment including an amplifier and speakers, or devices that incorporate the capability to simultaneously process both video and audio data, etc. Media playback device 125 may be connected to, and receive multimedia content from, content processing device 110 in a known manner.

Media agent 115 is generally included within computing device 120. Media agent 115 includes computer-executable instructions that are generally stored in a computer-readable medium, e.g., a magnetic disk, of computing device 120, and that may be executed by a processor included within computing device 120.

Content processing device 110 selectively communicates with gateway router 165 to send information to, and receive information from, packet switched network 160. An interactive program guide (IPG) server 170 also selectively communicates with router 165, sometimes via a network 160, although this is not the case in the embodiment illustrated in FIG. 1. A database 175 includes program guide information and may be included in IPG server 170, or may be part of a separate set of hardware and software. A video on demand (VOD) server 180, known for providing telecommunications customers with video content "on demand," is also in selective communication with content processing device 110, generally via a packet switched network 160.

A media distribution network 150 is a network for providing media transmissions, e.g., video signal 140 such as is known. For example, network 150 may include hardware and software for providing video signal 140 via coaxial cable and/or fiber optic cable. Video signal 140 is generally provided to a media distribution network 150 from a head end 145 in a known manner.

Packet switched network 160 is generally an internet protocol (IP) network. As such, network 160 generally uses one or more known protocols for transporting data, such as user datagram protocol (UDP), transport control protocol (TCP), hypertext transfer protocol (HTTP), etc. Further, network 160 may include a variety of networks such as a wide area network (WAN), e.g., the Internet, a local area network (LAN), etc. As is known, packet switched network 160 may be used to transport a variety of data, including multimedia data such as audio data and video data. Accordingly, it is to be understood that embodiments are possible in which networks 150 and 160 are in fact combined into a single network, or in which media distribution network 150 is simply omitted, wherein packet switched network 160 is used to provide video signal 140 to content processing device 110.

A gateway router 165 allows content processing device 110 to access packet switched network 160. By communicating with router 165, content processing device 110 is able to obtain a network address such as an internet protocol (IP) address, thereby enabling content processing device 110 to make requests to, and to receive data from, an IPG server 170.

IPG server 170 provides an interactive program guide to content processing device 110 for consumption using media playback device 125. As is known, an interactive program guide allows viewers of device 125 to obtain information and to select content, generally by navigating and making selections using control device 111. IPG server 170 generally includes a processor and a memory, as well as a computer readable medium such as a disk for storing data, e.g., interactive program guide data, to be provided to content processing device 110. IPG server 170 further provides media manager 105 for download to content processing device 110. Database 175, mentioned above, may provide interactive program guide content.

In the illustrated embodiment, fiber optic cable is used to provide both data and a video signal 140 to customer premises network 101, including to content processing device 110. As is known, an optical line terminal (OLT) 135 may serve as a terminus for an optical network or an optical line. OLT 135 may provide data, including video signal 140, to one or more optical network terminals (ONTs) 130. ONT 130 is generally situated adjacent to a customer premises, for the purpose of providing data received over an optical line to customer premises network 101, including content processing device 110. Accordingly, FIG. 1 illustrates a hybrid network system 100 in which video signal 140 transported over media distribution network 150, and also data transported over packet switched network 160, are received by customer premises network 101 through a fiber optic line. However, it should be understood that embodiments are possible in which content processing device 110 receives both data and audio/video communications via media other than fiber optic cables to customer premises network 101.

Computing devices such as content processing device 110, computing device 120, IPG server 170, VOD server 180, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Content processing device 110 generally is a specialized device for receiving video signals 140 from head end 145 via network 150, and may be provided with a proprietary or specialized operating system other than those enumerated above. For example, in one embodiment, content processing device 110 is an STB provided with a real time operating system (RTOS) such as is known. However, it is to be understood that content processing device 110 may be a computing device such as one of those enumerated above, so long as the computing device is capable of receiving video signals 140 from network 150, and also is capable of storing an executing the instructions included in media manager 105.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g. from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 2:
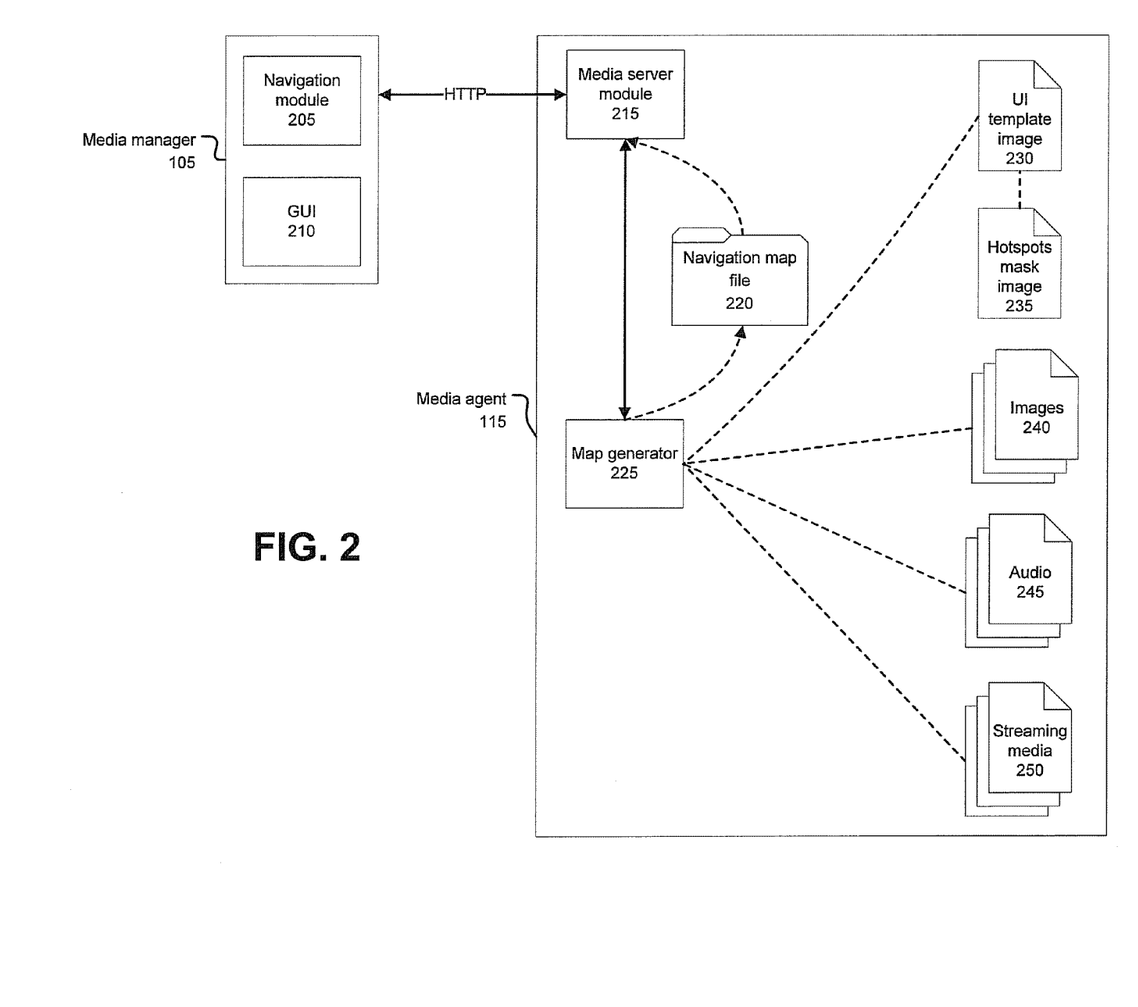
FIG. 2 illustrates certain exemplary details of a media manager and a media agent.

FIG. 2 illustrates exemplary details of media manager 105 and media agent 115, according to an embodiment.

As seen in FIG. 2, media manager 105 includes a navigation module 205 and a graphical user interface (GUI) 210. Navigation module 205 is used to allow media manager 105 to communicate with media agent 115. GUI 210 is rendered according to instructions from media manager 105 and is used to display menu options and information about multi-media content available for playback on device 125.

Media agent 115 includes a media server module 215, which communicates with media manager 105. A map generator 225 generates a navigation map file 220, which in turn is provided by media server module 215 to navigation module 205. Navigation map file 220 is used by navigation module 205 to render GUI 210.

To generate navigation map file 220, map generator 225 accesses a user interface (UI) template 230, a hot spots mask 235, images 240, and audio 245, all or some of which are generally stored within media database 122. Navigation map file 220 may also include a link to a source for streaming media content 250 that is accessible through packet switched network 160. For example, many sources for streaming audio and/or video are presently known on the Internet.

Figure 5A:
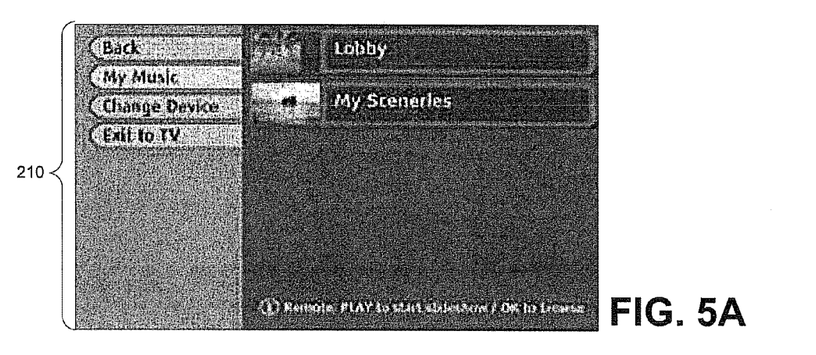
FIG. 5A provides an exemplary illustration of a graphical user interface displaying a list of shows of images available for playback on an audio/video display.
Figure 5B:
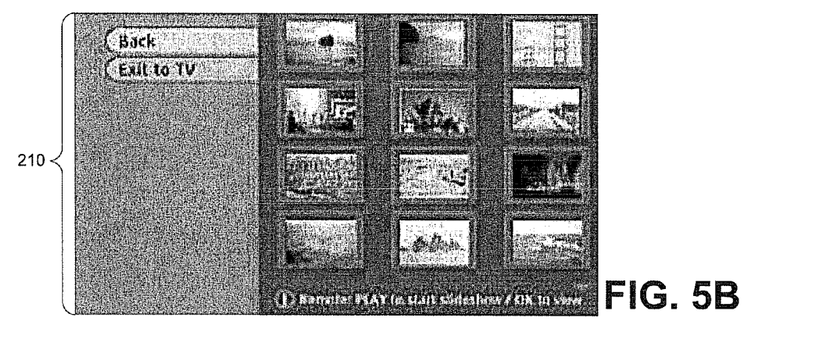
FIG. 5B illustrates an exemplary display of images in a graphical user interface on an audio/video display.
Figure 5C:
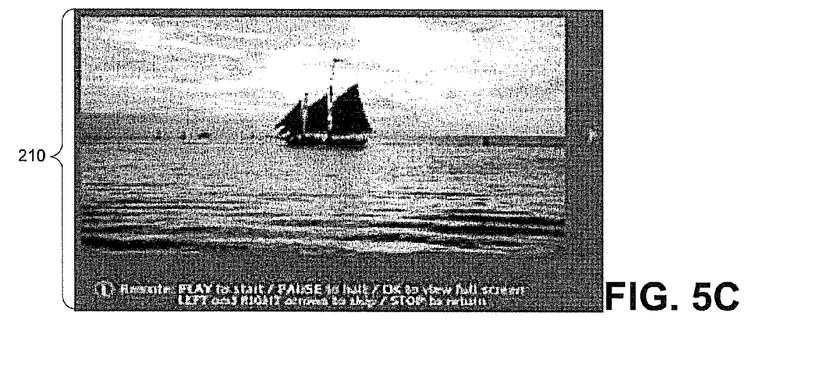
FIG. 5C illustrates an exemplary display of an images in a graphical user interface on an audio/video display.

Each time a user navigates from one screen or display in GUI 210 to another, media server module 215 provides a new navigation map file 220 to navigation module 205. That is, for each distinct combination of navigational elements such as menu items and arrow icons, etc., map generator 225 generates a distinct navigation map file 220, which is provided to navigation module 205 and rendered in GUI 210. However, as discussed elsewhere herein, a single navigation map file 220 may be used to display multiple images 240 or to play multiple files of audio 245 according to a playlist or slideshow included in the navigation map file 220. Similarly, multiple sources of streaming media content 250 may be included in a navigation map file 220. FIGS. 5A, 5B, and 5C illustrate examples of different combinations of menu items, arrow icons, etc. in GUI 210.

In general, navigation map file 220, generated by map generator 225, includes information about images 240, audio 245, and streaming media content 250 to available for viewing and/or listening using media playback device 125. Navigation map file 220 is further used to provide user access to images 240, audio 245, and streaming media content 250. That is, navigation module 205 accesses navigation map file, which will have been downloaded from media server module 215, both when displaying a list or menu of content 240, 245, and/or 250 that a user may access, and when such content 240, 245, and/or 250 is actually accessed and viewed and/or listened to by a user of media playback device 125.

Navigation in GUI 210, e.g., selections to access images 240, audio 245, or streaming media 250, or to access further information about images 240, audio 245, or streaming media 250 that are available for viewing and/or listening, may be made by accessing hotspots in GUI 210. A hotspot, as is known, is a special portion of a graphical user interface such as GUI 210 that, when selected, links to a new display or provides particular functionality within the graphical user interface. Hotspots are indicated in navigation map file 220 as illustrated below with respect to Table 1, and are thereby included in GUI 210, according to hot spots mask image 235.

Template image 230 provides formatting for information displayed in GUI 210, including images 240, audio 245, streaming media 250, as well as menu items, instructions etc.

Hot spots mask image 235 may be overlaid on template image 230 so that selected portions of template image 230 are covered, or masked, by hot spots mask image 235. The portions of template image 230 thus masked generally relate to navigational elements of GUI 210, such as menu items, arrow icons, and the like. Generally portions of hot spots mask image 235 are selectively overlaid on template image 230 to provide a user with information concerning navigation within GUI 210 that, when highlighted by a user, may be used to provide user input through control 111. For example, by noting the differences in the menu items provided in FIGS. 5A and 5B respectively, it can be seen that for each of the two instances of GUI 210 shown in FIGS. 5A and 5B different portions of a hotspot mask image 235 could be deployed. A user may navigate through various hotspots in GUI 210 using arrow keys or the like provided on control 210. As mentioned below, among other things, hotspots may provide a mechanism for users to navigate through presentations of images 240, audio 245, and/or streaming media 150.

As mentioned above, navigation map file 220 includes a set of information used to format the display of menu options and information about multi-media content in GUI 210. These instructions are assembled on computer 120 by map generator 225, including content assembled from UI template image 230 and hot spots mask image 235. Navigation map file 220 generally contains tags or instructions indicating a specific portion or portions of hot spots mask 235 to be displayed in GUI 210, for example, as illustrated below in Table 1.

Navigation map file 220 generally lists menu items and locations in which such menu items should be displayed in GUI 210. Navigation map file 220 further identifies images 240 and/or links to audio 245 to be included in the display in GUI 210, and provides information, e.g., path information, a uniform resource locator (URL), etc., concerning where such images 240 and/or audio 245 can be located in storage associated with computer 120. Navigation map file 220 may thereby include a playlist, slideshow, or the like according to which media such as images 240, audio 245, and/or streaming media 150 may be played and/or displayed. In addition, navigation map file 220 includes information concerning specific keys on control device 111, and actions to be taken when such keys are pressed. Further, navigation map file 220 generally includes hot spots mask 235, or information, e.g., path information, according to which hot spots mask 235 can be located. Hot spots mask image 235, as explained above, provides a mask for locations in GUI 210 where there are links that may be activated by a user of control 111. Table 1 below provides an exemplary layout for a navigation map file 220 providing for access to audio 245 ("Sound [0 . . . n]").

TABLE 1

| File Section | Attribute | Data Type | Values |
| --- | --- | --- | --- |
| NavigationMapHdr | FileType | char 4 | "NMAP" |
| | Version | char 4 (2 major, 2 minor) | "0100" |
| | Header Structure size | Int32 | sizeof(NavigationMapHdr) |
| | Template image | Byte[260] | Relative Path of the Image File |
| | Mask image | Byte[260] | Relative Path of the Mask File |
| | Number of Hot Spots | Byte | 0-255 |
| | Number of Remote Buttons | Byte | 0-255 |
| | Number of Actions | Byte | 0-255 |
| | Number of Sounds | Byte | 0-255 |
| | DefaultButton | Byte | 0-255, First Focus |
| | TimeOutAction | Byte | 0-255, Number of action to perform after time out |
| | Size of HotSpot | Int16 | 0-64K |
| | Size of RemoteButton | Int16 | 0-64K |
| | Size of Action | Int16 | 0-64K |
| | Size of Sound | Int16 | 0-64K |
| HotSpot [0 . . . n] | X | Int16 | 0-575 |
| | Y | Int16 | 0-479 |
| | Width | Int16 | 0-575 |
| | Height | Int16 | 0-479 |
| | ButtonLeft | Byte | Index to HotSpot # 1-255, 0 = Don't move |
| | ButtonRight | Byte | Index to HotSpot # 1-255, 0 = Don't move |
| | ButtonUp | Byte | Index to HotSpot # 1-255, 0 = Don't move |
| | ButtonDown | Byte | Index to HotSpot # 1-255, 0 = Don't move |
| | OkAction | Byte | Index to Action # 1-255, 0 = No Action |
| | Sound | Byte | Index to Sound # 1-255, 0 = No Sound |
| RemoteButton [0 . . . n] | Keycode | Int32 | a number from TVKeys Enum |
| | PressAction | Byte | Index to Action # 1-255, 0 = No Action |
| | Sound | Byte | Index to Sound # 1-255, 0 = No Sound |
| Sound [0 . . . n] | FilePath | char[260] | Relative Path for Sound File |
| Action [0 . . . n] | ActionType | Byte | 1 - Go to Another Map, 2 = Fire Event to App, 255 = Exit |
| | ActionData | Byte[260] | If ActionType = 1 put zero-delimited Path String<br>If ActionType = 2 put data for event<br>If ActionType = 255 put integer exit code |

Images 240 maybe any kind of images that may be stored upon a computer-readable medium. For example, images 240 may include files stored on in any one of a number of known formats in computing device 120, e.g., joint photographic experts group (JPEG) format, graphic interchange format (GIF), etc. because content processing device 110, e.g., a set-top box, may have a limited memory capacity, for inclusion in navigation map file 220 it is generally desirable to convert images 240 to a compression format that requires less storage space, such as Portable Network Graphics (PNG) format. PNG format is further suitable because, often, images 240 are displayed in a thumbnail format, e.g., the first image 240 in a slideshow presentation may be displayed in a menu in GUI 210 to represent the slideshow presentation, or all images 240 in a slideshow presentation may be displayed in GUI 210 in thumbnail format to provide the user with an overview of the slideshow presentation, and to allow the user to select particular slides or images 240 in the slideshow presentation that the user wishes to view.

Similarly, audio 245 maybe any kind of audio file that may be stored upon the computer-readable medium. For example, audio 245 may include files in any one of the number of known formats, e.g., MP3, etc.

Further, streaming media 250 may be in any one of a number of known formats for streaming media, such as MP3, a standard promulgated by the Motion Picture Experts Group (MPEG), the QuickTime format promulgated by Apple Computer, Inc. of Cupertino, Calif., etc. Sources for streaming media 250 are presently known. For example, radio stations and other providers of audio content frequently provide streaming audio media 250 in the form of an MP3 stream. Similarly, audio content 245 may be provided in the form of a "podcast" or the like in which a file of audio content, e.g., in MP3 format, WAV format, etc. may be downloaded via a network such as packet switched network 160 for playback. Further, although not illustrated in FIG. 2, navigation map file 220 could include video content.

Figure 3:
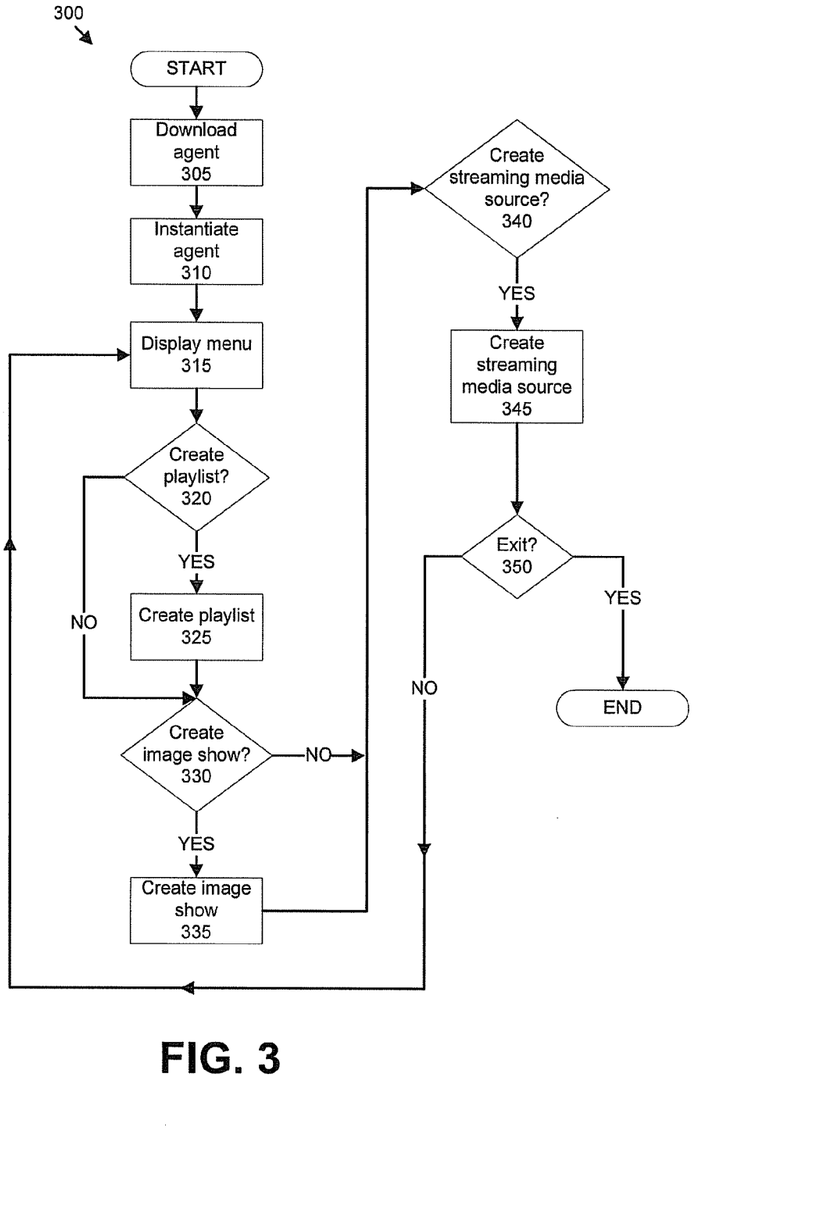
FIG. 3 illustrates an exemplary process for using a media agent.

FIG. 3 illustrates an exemplary process 300 for using media agent 115.

In step 305, media agent 115 is installed on computing device 120. In one embodiment, this installation is accomplished by downloading media agent 115 from IPG server 170. For example, a web page provided by IPG server 170 could provide an option to access media agent 115, thereby initiating a download of media agent 115 when such option was selected by a user. Of course, media agent 115 could be installed on computing device 120 in a variety of other ways, e.g., from a computer-readable medium such as a CD-ROM or a DVD, etc.

Next, in step 310, media agent 115 is instantiated on computing device 120. It is to be understood that in most instances of process 300, step 310 will be the first step executed, because media agent 115 will have already been downloaded to or installed on computing device 120 and will be stored on a computer readable medium included within or associated with computing device 120. Media agent 115 is a generally instantiated by a user selecting an icon, a menu item, etc. displayed on a display of computing device 120.

Next, in step 315, media agent 115 displays a menu of options on a display of computing device 120. This menu generally includes options to create a play list of audio 245 and/or a show of the images 240, or to select a source for streaming media content 250. Creation of such image shows and play lists is known, and generally involves associating different files of audio 245 together in a sequence or associating different files of images 240 together in a sequence, respectively. Files of images 240 or audio 245 may then be displayed or played in the sequence, or may be played or displayed randomly. In any event, it is known for computing device 120 to store such sequences for later retrieval and display or playing of files of images 240 or audio 245. As noted above, navigation map file 220 includes information for retrieving files of images 240 and/or audio 245 and thereby may include a playlist, a slideshow, or the like.

Next, in step 320, it is determined whether a user has selected a menu option to create a play list of audio 245. If so, process 300 proceeds to step 325. Otherwise, process 300 proceeds to step 330.

In step 325, media agent 115 creates a play list of audio 245, as is it is known to do, and as discussed above with respect to step 315. For example, media agent 115 may provide a user with the option to select files of audio 245 included in a file system associated with a computing device on which media agent 115 is installed. Media agent 115 may further provide the user with the option to associate such files together in a playlist, and to specify a sequence for the playback of such files, which sequence may also be included in the playlist. The playlist may then be included in a navigation map file 220. Following step 325, process 300 proceeds to step 330.

In step 330, it is determined whether a user has selected a menu option to create a show of images 240. If so, process 300 proceeds to step 335. Otherwise, process 300 proceeds to step 340.

In step 335, media agent 115 creates a show of images 240, as it is known to do, and as is discussed above with respect to step 315. For example, media agent 115 may provide a user with the option to select files of images 240 included in a file system associated with a computing device on which media agent 115 is installed. Media agent 115 may further provide the user with the option to associate such files together in a slideshow, and to specify a sequence for the playback of such files, which sequence may also be included in the slideshow. The playlist may then be included in a navigation map file 220. Following step 335, process 300 proceeds to step 340.

In step 340, it is determined whether a user has selected a menu option to select a source for streaming media 250. If so, process 300 proceeds to step 345. Otherwise, process 300 proceeds to step 340.

In step 345, media manager 115 allows the user to select a source for streaming media content 250, For example, media manager 115 may display a list of such sources from which a user may select, or may provide a form for allowing the user to identify such source, e.g., according to a URL or the like.

In step 350, it is determined whether input has been received from a user indicating that media agent 115 should be exited. If not, process 300 returns to step 315. Otherwise, process 300 ends.

Figure 4:
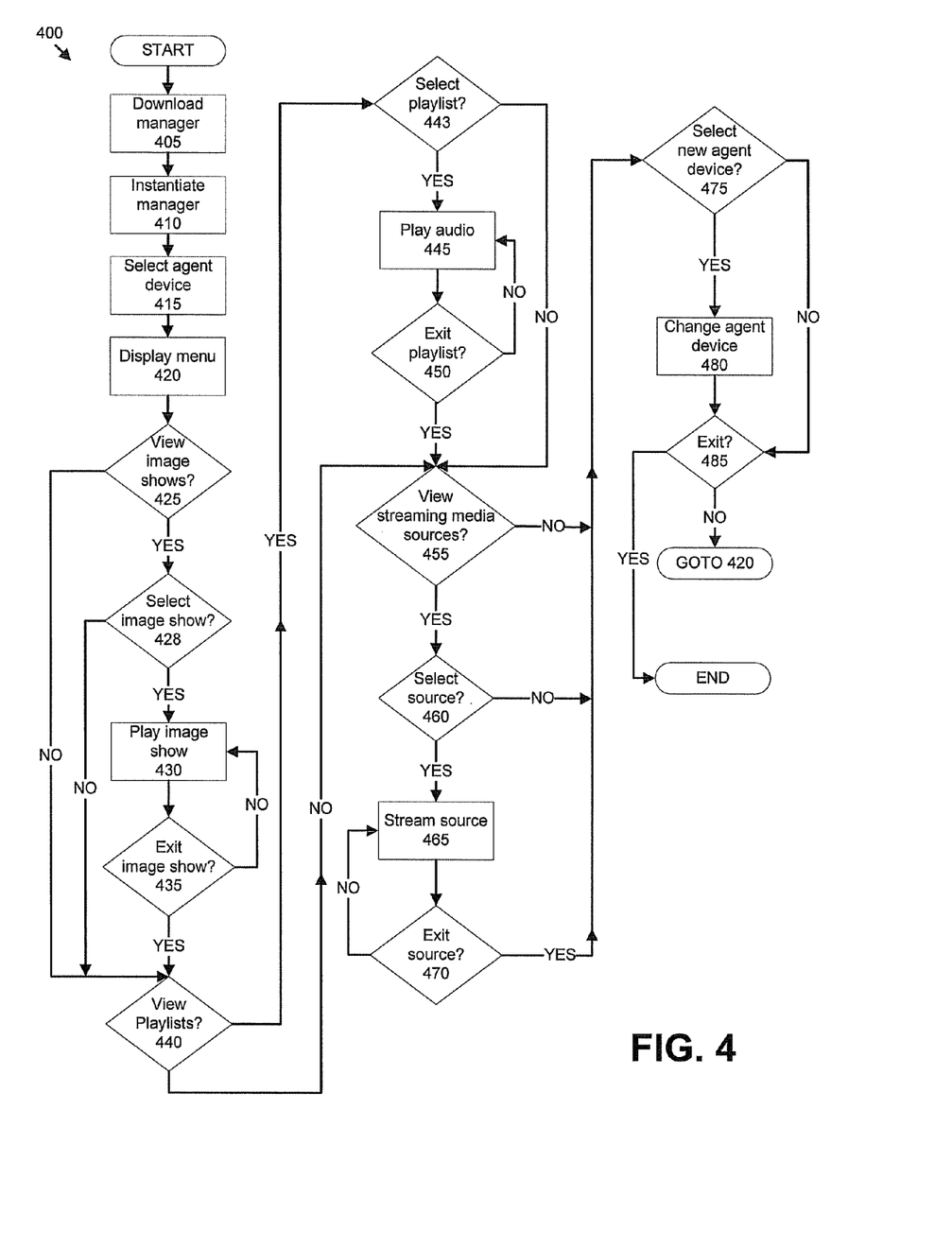
FIG. 4 illustrates an exemplary process for using a media manager.

FIG. 4 illustrates an exemplary process 400 for using media manager 105.

In step 405, media manager 105 is downloaded to content processing device 110. Media manager 105 is generally downloaded in the form of a compiled executable computer program written according to the requirements of an operating system of content processing device 110. For example, content processing device 110 may include the real-time operating system (RTOS), and media manager 105 may include program code written in the C/C++ or Java™ programming languages.

Next, in step 410, media manager 105 is instantiated on content processing device 110. Generally, media manager 105 is instantiated by a user making a selection with control 111, e.g., by selecting an option in an interactive program guide displayed on audio/video display 125. Because content processing device 110, e.g., a set-top box, may have relatively limited amounts of memory and/or storage space, in present embodiments it is preferable that media manager 105 is downloaded to content processing device 110 each time media manager 105 is to be instantiated on content processing device 110. Accordingly, in many embodiments, steps 405 and 410 are combined, such that the selection of media manager 105 from a menu in an interactive program guide or the like causes the download of media manager 105 to content processing device 110, and also causes media manager 105 to be instantiated on content processing device 110. However, embodiments are possible in which media manager 105 is stored in content processing device for multiple uses, e.g., media manager 105 may persist in a memory of content processing device 110 even when a user has ended use of media manager 105 or even turned content processing device 110 off.

Next, in step 415, a user selects an agent device, e.g., a computing device 120, to access images 240 and audio 245. For example, embodiments are possible in which images 240 and audio 245 are stored on a computer-readable medium in content processing device 110. Further, in addition to content processing device 110, it is possible that multiple computing devices 120 be connected to router 112, rather than the single computing device 120 shown in FIG. 1. Accordingly, available agent devices are listed and a displayed in GUI 210 audio/video display 125, from which list a user may select in step 415.

Next, in step 420, navigation module 205 retrieves navigation map file 220 from media server module 215, and uses information contained therein to display a menu of options for a user in GUI 210. An exemplary process for constructing and providing navigation map file 220 to media manager 105 is discussed below with reference to FIG. 6. Although construction and retrieval of navigation map file 220 will not be called out as a separate step hereafter in the description of process 400 each time a description is provided of information being rendered and displayed in GUI 210, it is to be understood that navigation map file 220 is generally used to display information, e.g., menu items, navigation arrows, images 240, audio 245, etc., in GUI 210, and that a distinct navigation map file 220 is generally required for each distinct rendering in GUI 210.

Next, in step 425, navigation module 205 determines whether a user has provided input indicating that the user wishes to see a list of available shows of images 240. If such input has been provided, process 400 proceeds to step 428. Otherwise, process 400 proceeds to step 440.

In step 428, a menu or list of shows of images 240 available for playback is displayed on a display of audio/video display 125. FIG. 5A provides an exemplary illustration of GUI 210 displaying a list of shows of images 240 available for playback on audio/video display 125. Further, navigation module 205 determines whether input has been received from a user indicating a particular show of images 240 that the user would like to have played back on a display of audio/video display 125. If such input has been received, process 400 proceeds to step 430. Otherwise, process 400 proceeds to step 440.

In step 430, navigation module 205 retrieves a navigation map file 220 including a show of images 240 from a media server module 215, and causes images 240 to be displayed in GUI 210 randomly or in a sequence as provided for in the navigation map file 220. Navigation map file 220 may also provide icons, navigation arrows, menus, buttons and the like to allow a user to navigate through images 240.

FIG. 5B illustrates an exemplary display of images 240. Note that, by using control 111, a user can cause a "slideshow" of images to 240 to be displayed in GUI 210 on audio/video display 125. Following the display of one or more images 240 as may be determined by the programming of navigation module 205, control proceeds to step 435.

Next, in step 435, it is determined whether input has been received from a user to exit the show of images 240 that is being played according to step 430. If not, control returns to step 430. Otherwise, control proceeds to step 440.

In step 440, navigation module 205 determines whether a user has provided input indicating that the user wishes to see a list of available play lists of audio 245. If such input has been provided, process 400 proceeds to step 443. Otherwise, process 400 proceeds to step 455.

In step 443, a menu or list of play lists of audio 245 available for playback is displayed on a display of audio/video display 125. Such a menu or list may be similar to the menu of a list of shows of images 240 illustrated in FIG. 5A. Further, navigation module 205 determines whether input has been received from a user indicating a particular play list of audio 245 that the user would like to have played back through media playback device 125. If such input has been received, process 400 proceeds to step 445. Otherwise, process 400 proceeds to step 455.

In step 445, navigation module 205 retrieves a navigation map file 220 including a play list of audio 245 from media server module 215, and causes audio 245 to be played through media playback device 125 randomly or in a sequence as provided for in the navigation map file 220. At the same time, GUI 210 may display information about audio 245 being played. Navigation map file 220 may also provide icons, navigation arrows, menus, buttons and the like to allow a user to navigate through audio 245. Note that, by using control 111, a user can cause a "play list" of audio 245 to be played through media playback device 125. Following the playing of one or more audio files 245 as may be determined by the programming of navigation module 205, control proceeds to step 450.

Next, in step 450, it is determined whether input has been received from a user to exit the play list of audio 245 that is being played according to step 445. If not, control returns to step 445. Otherwise, control proceeds to step 455.

In step 455, navigation module 205 determines whether a user has provided input indicating that the user wishes to see a list of available sources of streaming media 250. If such input has been provided, process 400 proceeds to step 460. Otherwise, process 400 proceeds to step 475.

In step 460, a menu or list of available sources of streaming media 250 is displayed on a display of audio/video display 125. Such a menu or list may be similar to the menu of a list of shows of images 240 illustrated in FIG. 5A. Further, navigation module 205 determines whether input has been received from a user indicating a particular sources of streaming media 250 that the user would like to have played back through media playback device 125. If such input has been received, process 400 proceeds to step 465. Otherwise, process 400 proceeds to step 475.

In step 465, navigation module 205 retrieves a navigation map file 220 including a link to one or more available sources of streaming media 250 from media server module 215, and causes streaming media 250 to be played to media player 115, e.g., upon a user selection of a streaming media 250 source. It will be understood that streaming media 250 may be provided to media player 115 through content processing device 110 in much the manner that content processing device 110 may provide video on demand to media player 115.

Next, in step 470, it is determined whether input has been received from a user to exit the play of streaming media 250 that is being played according to step 465. If not, control returns to step 465. Otherwise, control proceeds to step 475.

In step 475, navigation module 205 determines whether input has been received from a user indicating that the user wishes to select a new agent device for accessing audio 245 and/or images 240. For example, a user could select a menu option as shown in FIG. 5A. If input to select a new agent device has been received, process 400 proceeds to step 460. Otherwise, process 400 proceeds to step 465.

In step 480, navigation module 205 except input to select a new computing device 120 as an agent device for providing images 240 and audio 245. As explained above, navigation module 205 may communicate with any computing device 120 that is connected to router 112 and that includes media agent 115.

In step 485, navigation module 205 determines whether input has been received from a user to exit media manager 105. If such input has been received, process 400 ends. Otherwise, process 400 returns to step 420.

Figure 6:
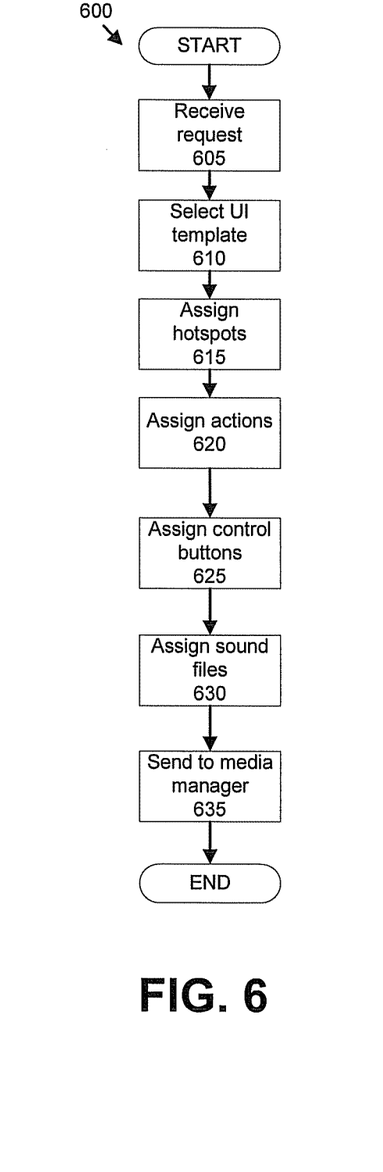
FIG. 6 illustrates an exemplary process for providing a navigation map file to a media manager.

FIG. 6 illustrates a process 600 for providing a navigation map file 220 to media manager 105.

In step 605, media server module 215 receives from navigation module 205 a request for navigation map file 220. This request is generally sent according to HTTP in customer premises network 101. Once received by navigation module 205, the request is provided to map generator 225 with instructions to construct navigation map file 220.

Next, in step 610, map generator 225 selects UI template image 230 to be used in generating navigation map file 220. UI template image 230 is generally selected according to parameters provided to media server module 215 in step 605, i.e., according to a specification of particular information, e.g., images 240, audio 245, etc. that a user has requested by selecting a menu item, a navigation arrow, etc. in GUI 210. As noted above, UI template image 230 incorporates both images 240 as well as navigational elements such as menu items, navigational buttons, etc. to be displayed in GUI 210.

Next, in step 615, map generator 225 selects hotspot mask image 235, or portions thereof, to be included in navigation map file 220. For example, in an embodiment, as shown in Table 1, navigation map file 220 specifies a number of hotspots, and the locations of the hotspots, to be rendered in GUI 210. Generally, the portions of hotspot mask image 235 specified in navigation map file 220 are specified according to the UI template image 230 selected in step 610 above. That is, different displays in GUI 210, having different navigational elements in different locations, require different hotspots to be rendered in GUI 210.

Next, in step 620, map generator 225 assigns actions to each of the hotspots specified in step 615. Generally actions are associated either with hotspots, that are assigned in this step 620, or with buttons on control 111, that are assigned as described below with respect to step 625. Examples of an action include navigating to a new display in GUI 210, exiting media manager 105, etc. As can be seen in Table 1, according to an embodiment, navigation map file 220 generally specifies a number of actions to be associated with hotspots in GUI 210. Further, navigation map file 220 generally specifies what the actions are, and indexes each action to a hotspot.

Next, in step 625, map generator 225 assigns buttons on control 111 to actions. For example, a right arrow key could be assigned to cause navigation to a "next" screen in GUI 210 to occur, and they left arrow key could be assigned to cause navigation to a "previous" screen in GUI 210 to occur. Accordingly, actions may be identified in navigation map file 220 as seen, for example, in Table 1 above.

Next, in step 630, map generator 225 assigns sounds to actions. For example, upon selection of a certain action, e.g., by selecting a hotspot, it may be desirable to play a beep or other similar sound to a user. Accordingly, as seen, for example, in Table 1, sound files may be included in navigation map file 220.

Generally after step 630, navigation map file 220 is complete. Accordingly, following step 630, in step 635, navigation map file is provided to navigation module 205, generally via customer premises network 101 via HTTP.

Following step 635, process 600 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
  a content processing device connected to a customer premises network and a second network, wherein the content processing device is configured to
    detect a computing device within the customer premises network;
    receive a navigation map file from the selected computing device, the navigation map file including a list of media content available from the computing device, links to the listed media content, and at least one control device key mapping;
    receive a request for the media content;
    request the media content from the computing device by utilizing a link in the navigation map file, whereby the specified media content is retrieved from the computing device via the customer premises network;
    receive a command from a control device after the specified media content is retrieved from the computing device; and
    perform an action with respect to the requested media content in response to the command, wherein the action is a user-defined action associated with the command based on the key mapping included in the navigation map file.

2. The system of claim 1, wherein the content processing device is further connected to a media distribution network.

3. The system of claim 2, wherein the content processing device is further configured to receive a video signal via the media distribution network.

4. The system of claim 1, wherein the content processing device is further configured to download program instructions for requesting and receiving the specified media content via the second network.

5. The system of claim 1, wherein the media content includes at least one of image content, audio content, streaming video content, and streaming audio content.

6. The system of claim 1, further comprising:
  a second computing device connected to the customer premises network, the second computing device configured to respond to a request for media content by providing the media content over the customer premises network;
  wherein the content processing device is further configured to detect the second computing device within the customer premises network and then to request selectively the media content from the second computing device, whereby the requested media content is retrieved from the second computing device.

7. The system of claim 1, further comprising a media playback device that selectively displays the specified content.

8. The system of claim 1, further comprising a router that is connected between the computing device and the content processing device, the router configured to transport data between the computing device and the content processing device.

9. A method, comprising:
  downloading, via a packet switched network external to a customer premises that includes a customer premises network, program instructions for detecting a computing device in the customer premises network;
  requesting, via the customer premises network, a navigation map file from the computing device, the navigation map file including a list of media content available from the computing device, a link associated with each instance of media content in the list, and at least one control device key mapping;
  receiving a request for an instance of media content listed in the navigation map file;
  requesting, via the customer premises network, the requested instance of media content from the computing device by utilizing the link associated with the requested instance of media content in the navigation map file;
  receiving a command from a control device after the specified media content is retrieved from the computing device; and perform an action with respect to the requested media content in response to the command, wherein the action is a user-defined action associated with the command based on the key mapping included in the navigation map file.

10. The method of claim 9, further comprising displaying the list of the available media content on a media playback device.

11. The method of claim 9, wherein the navigation map file includes a mask image and a thumbnail image.

12. The method of claim 9, wherein the navigation map file includes hotspots and actions associated with the hotspots.

13. The method of claim 9, wherein the media content includes at least one of image content, audio content, streaming video content, and streaming audio content.

14. A system, comprising:
a router within a customer premises;
a computing device connected and to the router and configured to respond to a request for media content by providing specified media content via the router; and
a content processing device connected to the router;
wherein the content processing device is configured to
detect the computing device by sending a message via the router;
receive a navigation map file from the computing device, the navigation map file including a list of media available from the computing device, links to the listed media content, and at least one control device key mapping;
receive a request for the media content;
request the media content from the computing device, whereby the specified media content is retrieved from computing device by utilizing a link in the navigation map file;
receive a command from a control device after the specified media content is retrieved from the computing device; and
perform an action with respect to the requested media content in response to the command, wherein the action is a user-defined action associated with the command based on the key mapping included in the navigation map file.

15. The system of claim 14, further comprising a media playback device that selectively displays the specified content.

16. The system of claim 14, further comprising:
a second computing device connected to the router, the second computing device configured to respond to a request for media content by providing the media content via the router;
wherein the content processing device is further configured to detect the second computing device via the router and then to request selectively the media content from the second computing device, whereby the requested media content is retrieved from the second computing device.

17. The system of claim 1, wherein the computing device is configured to generate the navigation map file by
receiving a request to make selected instances of media content available to the content processing device;
generating a link to each instance of media content;
selecting a thumbnail image for each instance of media content; and
associating an action with each thumbnail image.

18. The method of claim 9, further comprising generating the navigation map file by
receiving a request to make selected instances of media content available to the content processing device;
generating a link to each instance of media content;
selecting a thumbnail image for each instance of media content; and
associating an action with each thumbnail image.

19. The system of claim 14, wherein the navigation map file is generated by
receiving a request to make selected instances of media content available to the content processing device;
generating a link to each instance of media content;
selecting a thumbnail image for each instance of media content; and
associating an action with each thumbnail image.

20. The system of claim 1, the key mapping including at least one of instructions to perform an action and instructions to play a sound in response to the command from the control device.

21. The system of claim 1, wherein the requested media content is manipulated by the user-defined action.

22. The system of claim 1, wherein the user-defined action is associated with a specific media content instance.

23. The system of claim 9, the key mapping including at least one of instructions to perform an action and instructions to play a sound in response to the command from the control device.

24. The system of claim 9, wherein the requested media content is manipulated by the user-defined action.

25. The system of claim 9, wherein the user-defined action is associated with a specific media content instance.

26. The system of claim 14, the key mapping including at least one of instructions to perform an action and instructions to play a sound in response to the command from the control device.

27. The system of claim 14, wherein the requested media content is manipulated by the user-defined action.

28. The system of claim 14, wherein the user-defined action is associated with a specific media content instance.

* * * * *